United States Patent
Liu et al.

(10) Patent No.: US 10,826,972 B2
(45) Date of Patent: *Nov. 3, 2020

(54) CONTEXTUALIZED ANALYTICS PLATFORM

(71) Applicant: International Business Machines Corporation, Armonk, NY (US)

(72) Inventors: Guang Ya Liu, Xi'an (CN); Yi Li Wang, Xi'an (CN); Qing Yin, Xi'an (CN); Ming Zhao, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 374 days.

This patent is subject to a terminal disclaimer.

(21) Appl. No.: 14/925,802

(22) Filed: Oct. 28, 2015

(65) Prior Publication Data

US 2017/0104813 A1    Apr. 13, 2017

Related U.S. Application Data

(63) Continuation of application No. 14/881,255, filed on Oct. 13, 2015.

(51) Int. Cl.
*H04L 29/08* (2006.01)
*H04L 12/24* (2006.01)
(Continued)

(52) U.S. Cl.
CPC .......... *H04L 67/10* (2013.01); *H04L 41/5009* (2013.01); *H04L 41/5096* (2013.01);
(Continued)

(58) Field of Classification Search
CPC . H04L 43/10; H04L 63/20; H04L 2012/2849; H04L 41/5096; H04L 67/104; H04L 67/102; H04L 67/24
See application file for complete search history.

(56) References Cited

U.S. PATENT DOCUMENTS

| 8,694,770 B1 | 4/2014 | Osburn, III |
| 2007/0041315 A1* | 2/2007 | Massengill ......... H04L 41/0213 370/218 |

(Continued)

FOREIGN PATENT DOCUMENTS

WO    2015065370 A1    5/2015

OTHER PUBLICATIONS

Samreen et al., "Adaptive Decision Making in Multi-Cloud Management" Workshop on CrossCloud Brokers'14, Dec. 8-12, 2014, Bordeaux, France, Copyright 2014, ACM, 6 pages.

(Continued)

*Primary Examiner* — Barbara B Anyan
(74) *Attorney, Agent, or Firm* — Anthony M. Pallone

(57) ABSTRACT

In an embodiment of the present disclosure, there is provided a computer-implemented method, wherein the computer is operable between a management server and at least one cloud server providing a cloud service, the method comprising: collecting management data related to the cloud service through a standard protocol for network management, wherein the standard protocol allows communication of the management data via a designated port; and sending at least part of the management data to the management server.

9 Claims, 5 Drawing Sheets

(51) Int. Cl.
*H04L 12/26* (2006.01)
*H04L 12/911* (2013.01)
*H04L 29/06* (2006.01)
*G06F 11/30* (2006.01)
*G06F 11/34* (2006.01)

(52) U.S. Cl.
CPC .......... *G06F 11/3048* (2013.01); *G06F 11/34* (2013.01); *H04L 41/0213* (2013.01); *H04L 43/028* (2013.01); *H04L 43/08* (2013.01); *H04L 47/70* (2013.01); *H04L 63/0272* (2013.01)

(56) References Cited

U.S. PATENT DOCUMENTS

| | | | |
|---|---|---|---|
| 2012/0173708 | A1 | 7/2012 | Bartfai-Walcott et al. |
| 2012/0281708 | A1* | 11/2012 | Chauhan ............ H04L 63/0272 370/401 |
| 2013/0198171 | A1* | 8/2013 | Shah ................. G06F 17/30557 707/722 |
| 2014/0143083 | A1 | 5/2014 | Prathipati et al. |
| 2014/0280975 | A1 | 9/2014 | Mordani et al. |
| 2015/0067171 | A1 | 3/2015 | Yum |
| 2015/0096011 | A1 | 4/2015 | Watt |
| 2015/0172493 | A1 | 6/2015 | Anezaki et al. |
| 2015/0186945 | A1* | 7/2015 | Samuel ............. G06Q 30/0246 705/14.25 |
| 2015/0269565 | A1* | 9/2015 | Inotay ................. G06Q 20/354 235/380 |
| 2015/0304278 | A1* | 10/2015 | Johnson ................. H04L 63/02 726/11 |
| 2015/0312738 | A1* | 10/2015 | Deich .................. H04W 4/025 370/328 |
| 2016/0112339 | A1 | 4/2016 | Cheemalapati |
| 2016/0294734 | A1* | 10/2016 | Jang .................... H04L 41/0654 |
| 2016/0299826 | A1* | 10/2016 | Engelhardt ......... G06F 11/3048 |
| 2017/0329660 | A1* | 11/2017 | Salunke ................. G06F 11/34 |

OTHER PUBLICATIONS

Cuomo et al., "Enhancing an Autonomic Cloud Architecture with Mobile Agents", http://rd.springer.com/chapter10.1007%2F978-3-642-29737-3_11, printed Sep. 23, 2015, Springer for Research & Development, vol. 7155, 5 pages.

Mell et al., "The NIST Definition of Cloud Computing", National Institute of Standards and Technology, Special Publication 800-145, Sep. 2011, pp. 1-7.

Pending U.S. Appl. No. 14/881,255, filed Oct. 13, 2015, entitled: "Contextualized Analytics Platform", 36 pages.

IBM: List of IBM Patents or Patent Applications Treated as Related (Appendix P), Feb. 28, 2018, pp. 1-2.

* cited by examiner

CONTEXTUALIZED ANALYTICS PLATFORM

BACKGROUND

The present disclosure relates to data processing and communications, and particularly, to data collection in cloud computing environments.

Hybrid cloud is a cloud computing environment which uses a mix of private cloud and public cloud services with cooperation between the two kinds of platforms. Now days, hybrid cloud is widely used to provide greater flexibility and more data deployment options.

The management of resources is important for providing high quality cloud computing services. In a cloud environment, either a public cloud or a private cloud, usually there are many different kinds of resources including physical resources from different provision technology, virtual resources from different virtualization technology, network resources, storage resources, software and licenses etc. As a key point to manage these resources, the management system must collect information of the resources. Therefore, it is desirable to provide an effective solution for collecting management data in cloud environments.

SUMMARY

According to one embodiment of the present disclosure, there is provided a computer-implemented method, wherein the computer is operable between a management server and at least one cloud server providing a cloud service, the method comprising: collecting management data related to the cloud service through a standard protocol for network management, wherein the standard protocol allows communication of the management data via a designated port; and sending at least part of the management data to the management server.

According to another embodiment of the present disclosure, there is provided a system. A system comprises a computer which is operable between a management server and at least one cloud server providing a cloud service, the computer comprising one or more processors; a memory coupled to at least one of the processors; a set of computer program instructions stored in the memory and executed by at least one of the processors in order to perform actions of: collecting management data related to the cloud service through a standard protocol for network management, wherein the standard protocol allows communication of the management data via a designated port; and sending at least part of the management data to the management server.

According to another embodiment of the present disclosure, there is provided a computer program. The computer program comprising a computer readable storage medium having program instructions embodied therewith, wherein the computer is operable between a management server and at least one cloud server providing a cloud service, the program instructions executable by a processor to cause the processor to: collect management data related to the cloud service through a standard protocol for network management, wherein the standard protocol allows communication of the management data via a designated port; and send at least part of the management data to the management server.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
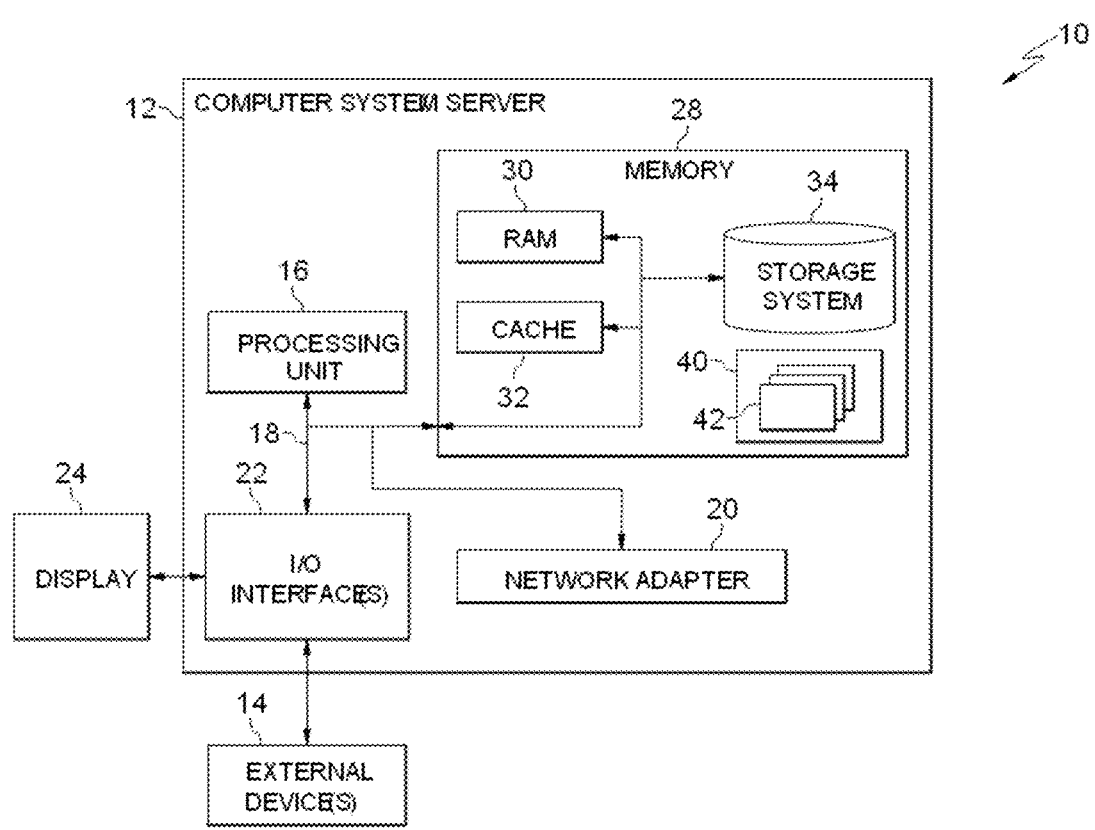
FIG. 1 depicts an exemplary computer system which is applicable to implement some embodiments of the present disclosure.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments of the present disclosure provide a data collection method that collects management data of resources in at least one private network and sends at least part of the management data to a management server in a management network, and which provides enhanced security and efficiency for a hybrid cloud environment.

Figure 2:
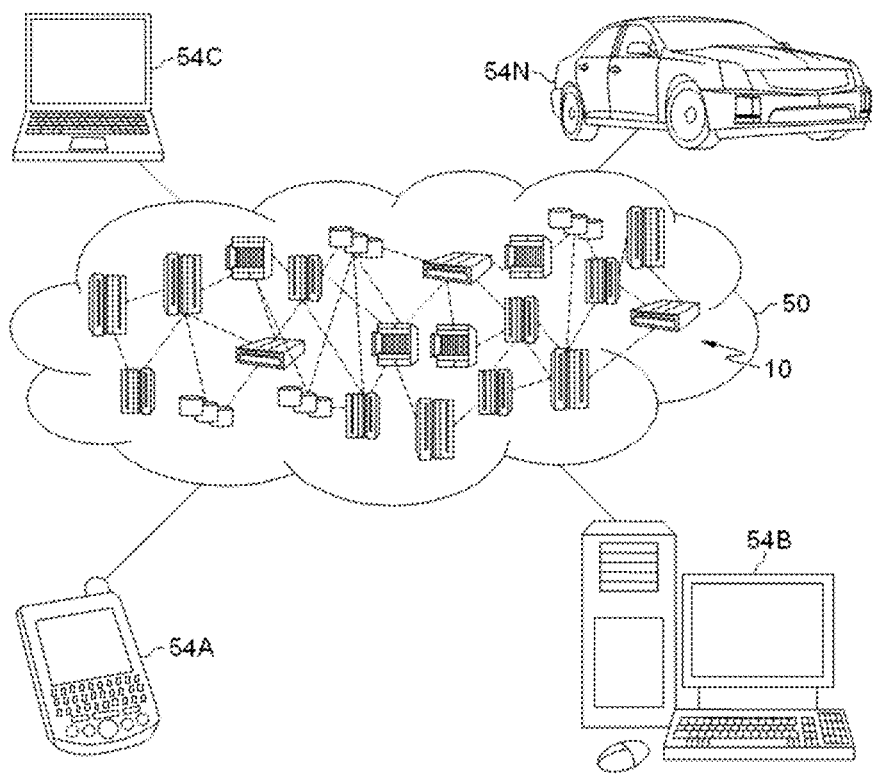
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
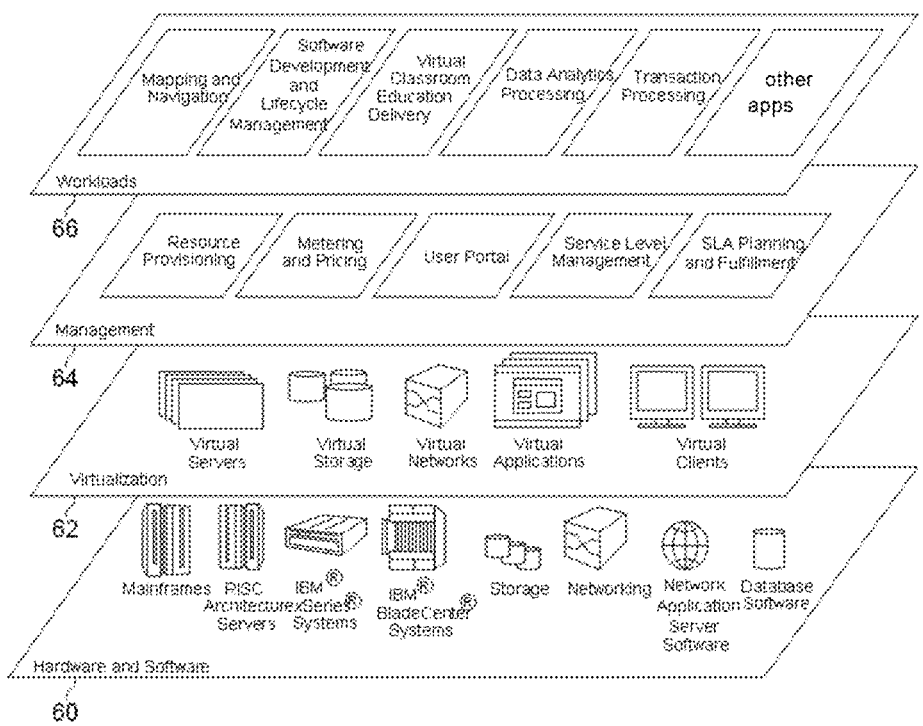
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide examples of functionality for which the cloud computing environment may be utilized. Examples of management and functions which may be provided from this layer include: Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. As mentioned above, all of the foregoing examples described with respect to FIG. 3 are illustrative only, and the disclosure is not limited to these examples.

It is understood all functions of the present disclosure as described herein typically may be performed by management data collection function/engine, which can be tangibly embodied as modules of program code 42 of management data collection program/utility/engine 40 (FIG. 1).

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and other applications.

As discussed above, the management of resources is important for providing high quality cloud computing services. Collection of management information for the resources is the starting point for management. The term "management data" here may comprise metrics data, status data, and any other types of data that are useful for management.

Figure 4:
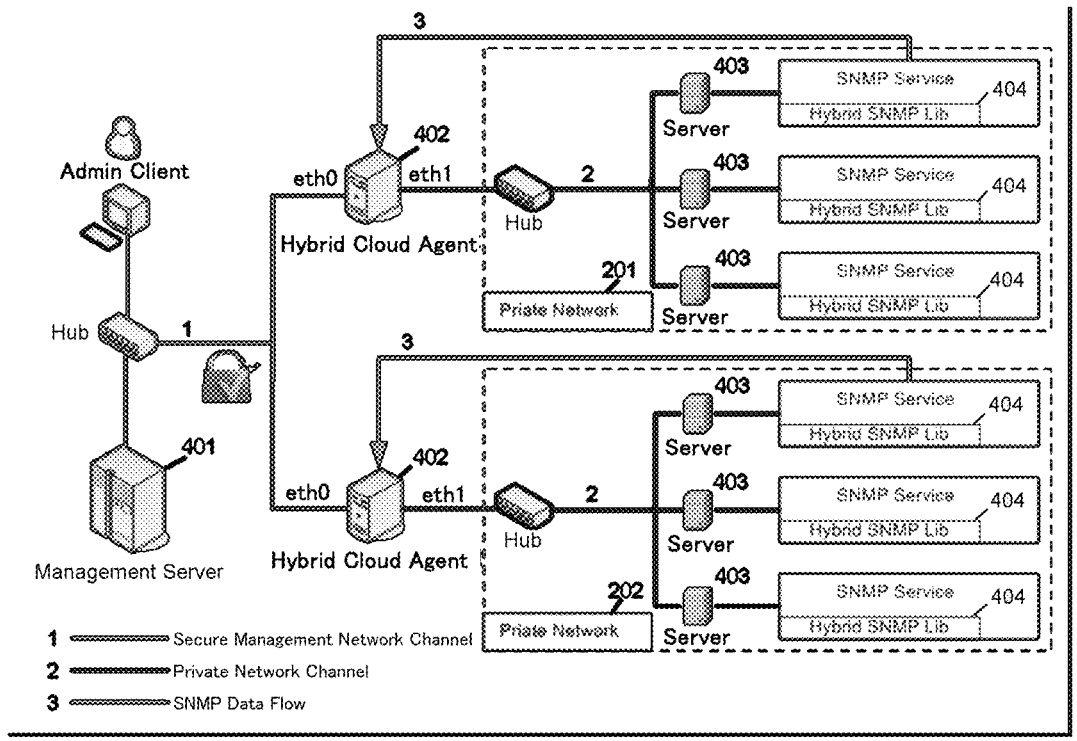
FIG. 4 depicts a hybrid cloud system according to an embodiment of the present disclosure.

FIG. 4 shows an exemplary system for data collection in a hybrid cloud environment according to an embodiment of the present disclosure. As shown in FIG. 4, the system comprises a management server 401 and a plurality of servers 403 operably connected to the private network 1 or 2. The servers 403 may function as nodes in the cloud system, for example, as any of the nodes 10 in the cloud computing environment 50, as described above with FIG. 2.

The management server 401 located at the management network 1 is the central management point of the hybrid cloud system. An administrator of the cloud system may access the management server 401 to view and control the managed objects in the hybrid cloud system. Generally, there are more components which work as a resource scheduler (not shown) for scheduling the resources of the cloud system. The resource scheduler can provide dynamic resource management for cloud environments to optimize business agility and reduce cost of cloud ownership. In this embodiment, the resource scheduler typically allocates resources according to the management data which collected from the servers 403. Details of resource scheduling have been described, inter alia, by Jeff Shiver in his article entitled "Using Metrics to Influence Planning and Scheduling Behaviors" (http://reliabilityweb.com/index.php/articles/Using_Metrics_to_Influence_Planning_and_Scheduling-_Behaviors/), which is incorporated herein by reference in its entirety.

One conventional data collection technique is adding an agent module into the managed object, for example, a cloud server. The agent module collects information about performances, capacities and availabilities of the resources, and sending the information to a management server via network. However, a disadvantage of this solution is that, when the managed object is in a private network, the agent module may be unable to talk with the management server which is placed in a management network. The problem will be more serious if there are multiple private networks in a hybrid cloud environment.

As an exemplary solution to solve the problem, the system in FIG. 4 further comprises and two hybrid cloud agents 402. The two hybrid cloud agents 402 are operably connected to the management network 1 and, to the private networks 201 and 202 respectively. The machine on which a hybrid cloud agent 402 is running has two network interface cards (NICs). One of the NICs connects to the management network and the other connects to the private network. Another problem in conventional techniques is that an agent module usually needs an exclusive port to communicate with the management server. This often risks the security of firewalls. When the port number changes during runtime phase, it is difficult to maintain the level of security for the whole system.

The hybrid cloud agents 402 are management nodes in the private networks, which can run different actions such as virtual machine (VM) operations, volume operations and so on. But basically, the hybrid cloud agent 402 is configured to collect management data with respect to the managed objects in the private network. With the help of hybrid SNMP library 404 at each cloud server 403, the hybrid cloud agent 402 may collect the management data from the cloud server 403 via SNMP messages, which will be described in more detail below.

Moreover, the communication between the hybrid cloud agent 402 and the cloud server 403 is implemented through exchanging SNMP messages. An SNMP message takes the form of a Protocol Data Unit (PDU), basically a fancy word for packet. The common SNMP messages are as follows:

GetRequest, which obtains one or more parameter values from a SNMP agent;

GetNextRequest, which obtains the next parameter values of the obtained one or more parameter values from the SNMP agent;

Set, which sets one or more parameter values of a SNMP agent;

Response, which is returned by a SNMP agent in response to at least one of the above three operations;

Trap is the only PDU sent by an SNMP agent on its own initiative. It is used to notify an unusual event that may demand further attention.

SNMP protocol uses the default UDP port 161 for general SNMP messages, such as GetRequest, GetNextRequest, Set, Response, and uses UDP port 162 for SNMP trap messages. According to the exemplary architecture shown in FIG. 3, an exclusive port between the hybrid cloud agent 402 and the cloud server 403 is not necessary anymore.

As shown in FIG. 4, the cloud servers 403 are installed with SNMP services. As well known in the art, simple network management protocol (SNMP) is an Internet-standard protocol for managing devices on IP networks. Devices that typically support SNMP include routers, switches, servers, workstations, printers, modem racks and more. SNMP is widely used in network management systems to monitor network-attached devices for conditions that warrant administrative attention. SNMP is a component of the Internet Protocol Suite as defined by the Internet Engineering Task Force (IETF). It consists of a set of standards for network management, including an application layer protocol, a database schema, and a set of data objects.

SNMP exposes management data in the form of variables on the managed systems, which describe the system configuration. These variables can then be queried (and sometimes set) by managing applications. In typical uses of SNMP one or more administrative computers, called managers, have the task of monitoring or managing a group of hosts or devices on a computer network. Each managed system executes, at all times, a software component called an SNMP agent which reports information via SNMP to the manager.

In this embodiment, the SNMP service of the cloud servers 403 can support SNMP and function as SNMP agents. Additionally, the SNMP services of the servers 403 are extended to collect cloud-related information. This is done by the hybrid SNMP library 404, which is a dynamic link library (DLL). The hybrid SNMP library 404 is loaded when an SNMP service starts on the managed object 403. When the SNMP service has started on the managed object 403, the hybrid SNMP library 404 will collect relevant management data as defined in an MIB. More details about the MIB and the hybrid SNMP library 404 will be described below.

In this way, there is no need to launch a new agent process on the managed objects, as it has become a part of the SNMP process. In other words, it exists in the SNMP process together. Therefore, a user can do security configuration for SNMP process via firewall and the configuration SNMP service itself as normal. The administrators of the private network 1 or 2 can monitor and control the behavior of the SNMP services at the servers 403, just as what they do when managing a normal SNMP agent. No exclusive port number is necessary for the data collection. In this way, security mechanism may be used without breaking the safety of a firewall.

As shown in FIG. 4, the collected management data are sent from the SNMP services to one of the hybrid cloud agents 402 via its private network connection (as indicated by arrow 3). In this embodiment, security model of SNMP v3 may be used to enhance the safety of communications between the SNMP services and the hybrid cloud agent 402.

After receiving the management data collected from the servers 403, the hybrid cloud agents 402 send at least part of the management data to the management server 401 via their connections to the management network. In this embodiment, the management data are sent via a secured channel, in which the management data are encrypted.

In this embodiment, a hierarchy is formed by the management server, hybrid cloud agents and SNMP services. In this hierarchical structure, the hybrid cloud agents are in the middle layer, working as management nodes. They can collect management data of the managed objects in the private networks and send the data to the central management server. It is understood that the hierarchical structure shown in FIG. 4 is merely for illustration. The actual structure of implementation may vary according to actual situations. For example, when the number of managed objects increases, there may be more than two hybrid cloud agents 402. They may form layers, as the number increases. That is, the middle-layer of hybrid cloud agents may be consisted of multiple layers. The hybrid cloud agents of a lower level may report to their master agents on an upper level respectively.

Figure 5:
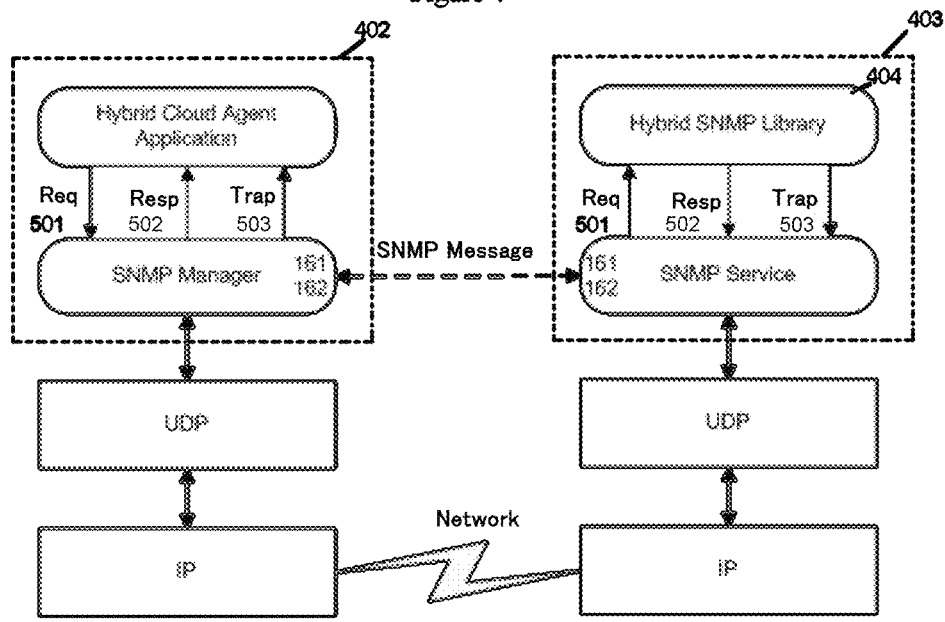
FIG. 5 depicts an exemplary communication framework according to an embodiment of the present disclosure.

FIG. 5 shows an exemplary communication framework based on SNMP according to an embodiment of the present disclosure. SNMP is a protocol on top of user datagram protocol (UDP). SNMP agents expose management data on the managed systems as variables. The protocol also permits active management tasks, such as modifying and applying a new configuration through remote modification of these variables. The variables accessible via SNMP are organized in hierarchies. These hierarchies, and other metadata (such as type and description of the variable), are described by Management Information Bases (MIBs).

In the configuration shown in FIG. 5, the hybrid cloud agent 402 functionally comprises an SNMP manager and a hybrid cloud agent application. The managed object 403 functionally comprises an SNMP service extended with a hybrid SNMP library 404. The SNMP service acting as an SNMP agent exposes management data in the form of variables on the managed objects 404. These variables can then be queried and sometimes set by the SNMP manager of the hybrid cloud agent 402. As described above, the hybrid SNMP library 404 is an extension of SNMP in the form of DLL. For example, Microsoft Windows has implemented SNMP in two services: SNMP.EXE and SNMPTRAP.EXE. It also allows extended DLLs to work along with the services.

The arrowed lines 501 and 502 show the process of SNMP GetRequest, which is a manager-to-agent request to retrieve the value of a variable or list of variables. Specifically, the lines 501 show the flow of request message. First, the hybrid cloud agent 402 may initiate a request message either on its own behalf or following the management server's instruction. Then, the message is passed to the SNMP manager, which sends it to the SNMP service of the managed object 403 via UDP/IP packages. When the SNMP service (acting as an SNMP agent) of the managed object 403 gets the message request, it will ask the hybrid SNMP library 404 to prepare the response data. When the response data is ready, it will send them back via a response SNMP message, as indicated by the lines 502.

The arrowed lines 503 show the process of SNMP Trap, which enables the SNMP service of the managed object 403 to notify the hybrid cloud agent 402 of certain events by way of an unsolicited SNMP message. For example, when the SNMP service is started on the managed object 403, a trap message which contains IP address and static metric data can be sent to the hybrid cloud agent 402. Thus, the hybrid cloud agent 402 can start collecting metrics data of the managed object 403 via SNMP operations. Moreover, when the IP address of the managed object 403 is changed, a trap message will be sent again to the hybrid cloud agent 402. After resolving the IP address from the trap message, the hybrid cloud agent 402 will report the updated IP to the management server 401.

In this embodiment, the communications between the SNMP service and the hybrid cloud agent can be performed via SNMP v3. It is known that SNMP v3 employs RFC 3414 user-based security model (USM) and supports three security levels. SNMP v3 can be used to enforce the security of the SNMP messages transmitted between the hybrid cloud agent 402 and the SNMP service.

Figure 6:
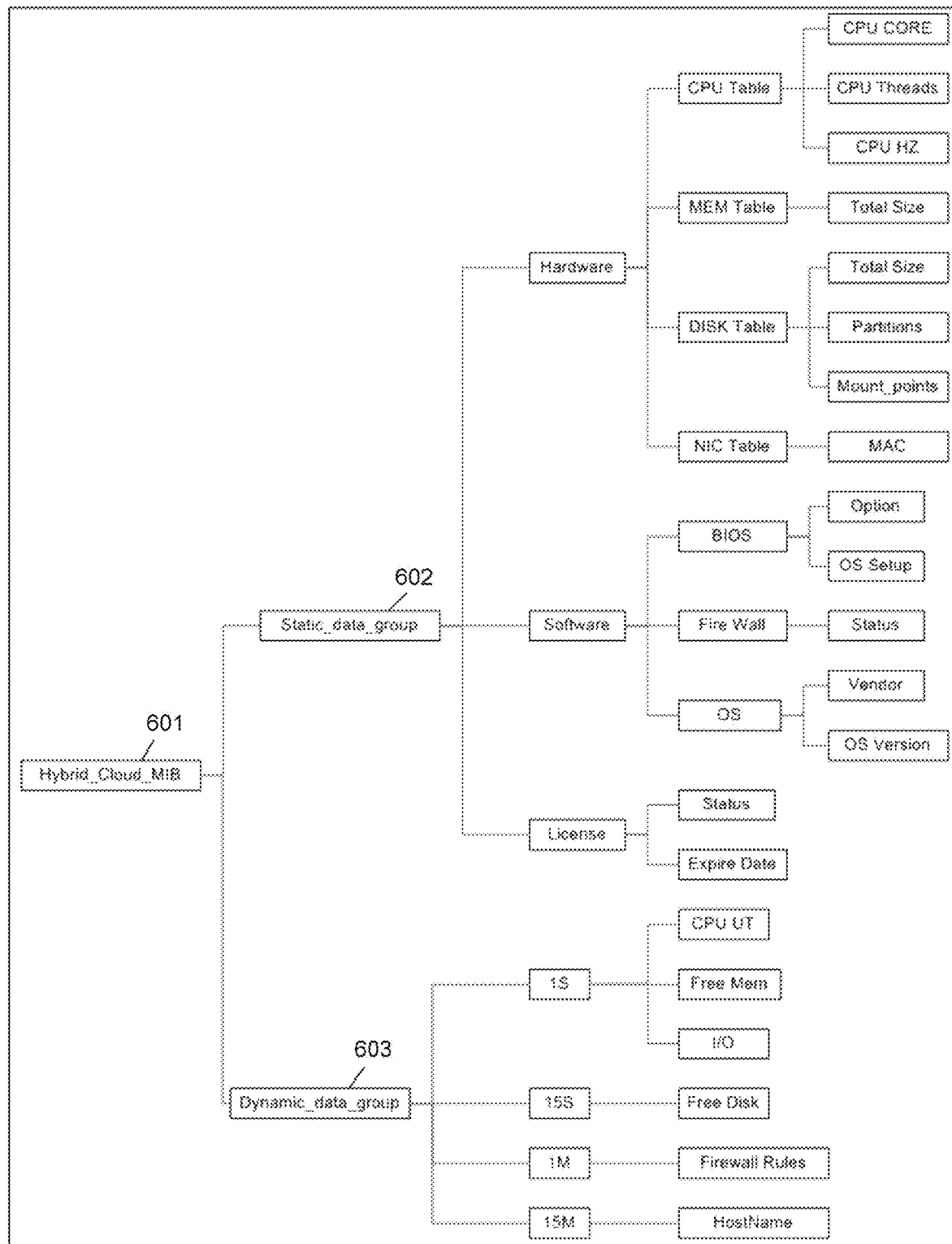
FIG. 6 depicts an exemplary hybrid cloud MIB structure according to an embodiment of the present disclosure.

FIG. 6 shows an exemplary MIB that the hybrid SNMP library is configured to work with according to an embodiment. A management information base (MIB) 601 is a database used for managing the objects in a communications network. While intended to refer to the complete collection of management information available on an object, it is often used to refer to a particular subset, more correctly referred to as MIB-module.

As shown in FIG. 6, the hybrid cloud MIB comprises a hierarchical structure, in which each entry is addressed through an object identifier (OID). In a hybrid cloud system, there may be a large scale of management data to be collected, which may cause bottleneck in the server. For efficiency, the data in MIB are divided into two categories: static data group 602 and dynamic data group 603. The data in static data group 602 comprises information about basic configuration. They usually do not change during the runtime phase of a hybrid cloud library (i.e. an SNMP service). The static data may include, but is not limited to, CPU core number, CPU threads, CPU HZ, total size of MEM table, total size/partitions/mount points of disk, MAC address, option/OS setup of BIOS, status of firewall, vendor/version of OS, status/expire date of licenses, etc. On the other hand, the data in dynamic data group 603 may change from time to time. Examples of the dynamic data may include, but is not limited to, CPU utilization, free memory, I/O, free disk, firewall rules, hostname, etc.

As described above, when the SNMP service is started, the static data will be collected and proactively sent to the hybrid cloud agent 402 via SNMP trap message. In this embodiment, after that, the static data will not be sent until the restart of the SNMP service or certain trigger events, such as change of IP address.

To further improve efficiency, the hybrid cloud agent 402 does not query the dynamic data all the time. It is know that some of the dynamic data (e.g. CPU utilization) changes frequently while others may change less often (e.g. OS hostname). In this embodiment, when the hybrid cloud agent 402 queries the dynamic data, it works in four threads of different frequencies—"1 minute", "10 minutes", "30 minutes", and "1 hour". For example, "CPU utilization" may be queried every 1 minute; "free disk" may be queried every 10 minutes; "firewall rules" may be queried every 30 minute; and "OS hostname" may be queried every 1 hour.

Figure 7:
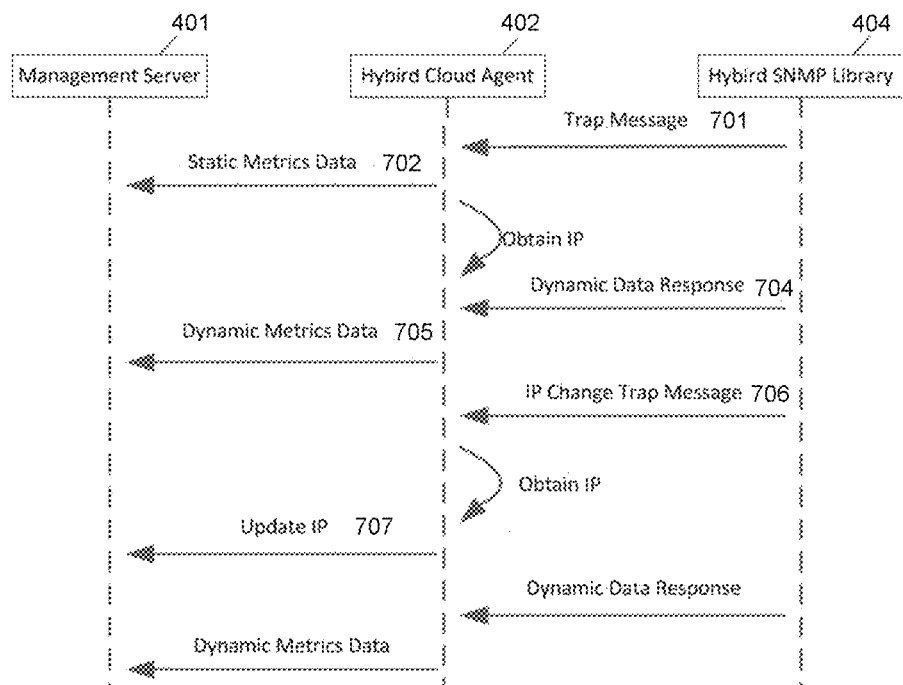
FIG. 7 depicts the process of management data collection in a hybrid cloud system according to an embodiment of the present disclosure.

FIG. 7 depicts the process of data collection according to an embodiment. In this embodiment, the managed objects are transparent to the management server 401 at the very beginning. When an SNMP service is firstly started on a managed object 403 (not shown), a trap message containing IP address and static metric data about the managed object 403 is sent to the hybrid cloud agent 402 at step 701. In addition to forwarding the static metric data to the management server 401 (step 702), the hybrid cloud agent 402 collects metrics data of the managed object through SNMP operations (step 704). As described above, the hybrid cloud agent 402 may query dynamic data with different frequencies. When receiving and resolving the dynamic metrics data, the hybrid cloud agent 402 send them to the management server 401.

Further, if the managed object's IP address changes, this will trigger an SNMP trap message to the hybrid cloud agent 402 (step 706) informing the change. After the hybrid cloud agent 402 resolves the IP address, it will report the updated IP address to the management server 401.

It is noted that the hybrid cloud agent 402 may receive more dynamic data responses or trap messages. The sequence of steps 704-707 is only for demonstration.

Figure 8:
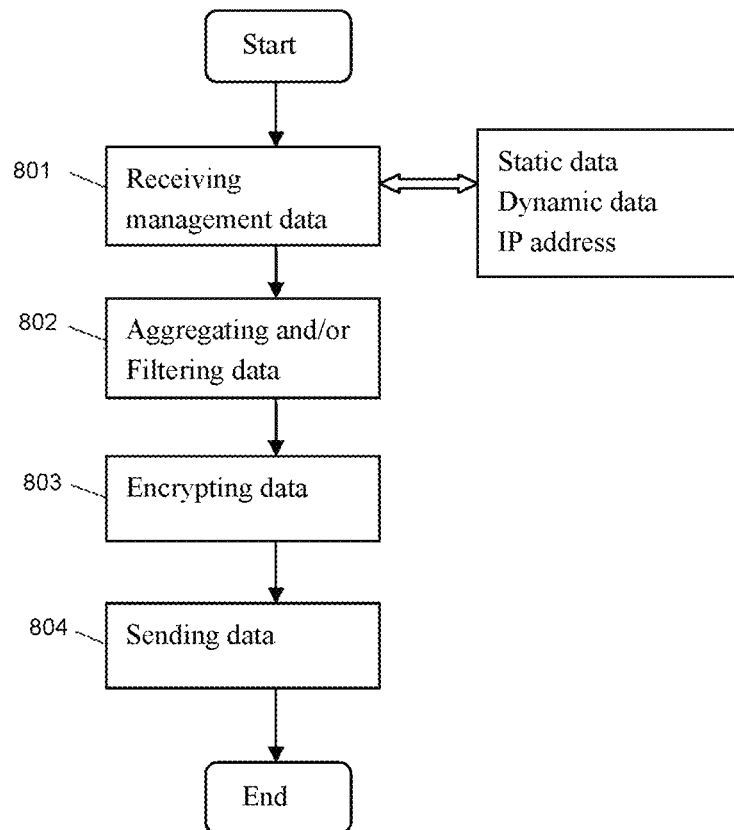
FIG. 8 is a flowchart showing the process of management data collection according to an embodiment of the present disclosure.

FIG. 8 shows the process of data collection according to an embodiment of the present disclosure. For brevity, the descriptions of those steps and components similar to the above embodiments are omitted below.

As shown in FIG. 8, at step 801, the hybrid cloud agent 402 collects management data of the managed object. As described above, this step can comprise receiving a trap message containing static data and IP, a response message containing requested data, a trap message containing an updated IP, and any combinations of them. The hybrid cloud agent 402 may also receive management data from multiple managed objects.

Then, at step 802, the hybrid cloud agent 402 may aggregate and/or filter the collected data. For example, the hybrid cloud agent 402 may received multiple response or trap messages from multiple managed objects 403. In this embodiment, the hybrid cloud agent 402 may aggregate and filter the collected data before sending to the management server 401. This can avoid unnecessary data transmission and reduce the traffic in the management network and the workload of the management server 401. In order to add a filter module (not shown) in the hybrid cloud agent 402, one or more filtering rules are specified. For example, a filtering rule may be set based on the Object Identifiers OID designated for a request message or a response message, or based on the value field in a response message.

Specifically, when using a common packet analyzer wireshark as a SNMP filter, if want to filter the data in a response message containing a value field with the type of OID and a value "1.3.6.1.4.1.6387.400.10.16", the filtering rule would be "snmp.value.oid==1.3.6.1.4.1.6387.400.10.16". And if want to filter the data in a response message containing a value field with the type of OctetString and the value having the initial "m", the filtering rule would be "snmp.value.octets matches "^m"". It should be understood that the exemplary filtering rules are merely for illustration and embodiments of the present disclosure are capable of being implemented in conjunction with any other type of filtering techniques now known or later developed.

At step 803, the hybrid cloud agent 402 may encrypt the data to be reported to the management server 401. For example, this can be done by VPN or PGP. At step 804, the hybrid cloud agent 402 send the management data to the management server 401.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, wherein the computer is operable in a hybrid cloud environment comprising a management server on a management network and at least one cloud server on a private network, the at least one cloud server providing, via the computer, a cloud service to the management network, and wherein the computer is connected to the management network via a first network interface card, and wherein the computer is connected to the private network via a second network interface card, the method comprising:

collecting by a hybrid cloud agent outside of the private network, from the at least one cloud server on the private network, management data related to the cloud service through a standard protocol for network management, the standard protocol providing for executing one or more agents, and wherein the standard protocol allows communication of the management data via a designated non-exclusive port, and wherein the management data is collected by the hybrid cloud agent via the second network interface card, and wherein the management data comprises static data and dynamic data in a management information base, and wherein the dynamic data are classified into a plurality of categories which are collected within different time intervals; and sending, by the hybrid cloud agent via the first network interface card, at least part of the management data to the management server on the management network.

2. The method according to claim 1, wherein the management data comprise at least one of metrics information and status information about the at least one cloud server providing the cloud service.

3. The method according to claim 1, wherein the step of collecting further comprises:

receiving the static data in the management data through a notification about change of the at least one cloud server being reported by a protocol agent which is configured to collect the management data from the at least one cloud server; and requesting and receiving the dynamic data in the management data from the protocol agent.

4. The method according to claim 1, wherein the step of collecting comprises:

requesting and receiving the management data from a protocol agent which is configured to collect the management data from the at least one cloud server.

5. The method according to claim 4, wherein the step of collecting further comprises:

receiving a notification about change of the at least one cloud server from the SNMP agent.

6. The method according to claim 4, wherein the step of filtering is based on at least one filtering rule.

7. The method according to claim 1, wherein
the at least one cloud server comprises a plurality of cloud servers;
the protocol agent comprises a plurality of protocol agents configured to collect management data for the plurality of cloud servers respectively from the plurality of protocol agents.

8. The method according to claim 1 further comprising at least one of the following steps:
aggregating the management data from the plurality of protocol agents; and
filtering the management data.

9. The method according to claim 1, wherein the management data is collected via a private network channel, and wherein the at least part of the management data is sent to the management server via a management network channel.

* * * * *